United States Patent
Kim et al.

(10) Patent No.: US 10,367,663 B2
(45) Date of Patent: Jul. 30, 2019

(54) METHOD FOR CANCELLING SELF-INTERFERENCE BY APPARATUS THAT USES FDR SCHEME

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/755,413

(22) PCT Filed: May 24, 2016

(86) PCT No.: PCT/KR2016/005472
§ 371 (c)(1),
(2) Date: Feb. 26, 2018

(87) PCT Pub. No.: WO2017/043731
PCT Pub. Date: Mar. 16, 2017

(65) Prior Publication Data
US 2018/0254926 A1   Sep. 6, 2018

Related U.S. Application Data

(60) Provisional application No. 62/215,039, filed on Sep. 7, 2015.

(51) Int. Cl.
*H04W 52/24* (2009.01)
*H04L 25/03* (2006.01)
(Continued)

(52) U.S. Cl.
CPC .......... *H04L 25/0328* (2013.01); *H04L 25/02* (2013.01); *H04L 25/03* (2013.01);
(Continued)

(58) Field of Classification Search
CPC .............. H04W 52/0238; H04B 3/487; H04Q 2011/0049; H04N 5/359; H04L 5/1461; H04K 3/28
(Continued)

(56) References Cited

U.S. PATENT DOCUMENTS 8,457,079 B2 * 6/2013 Krishnamurthy ............................ H04W 56/0045 370/336
8,649,418 B1 * 2/2014 Negus .................. H04B 7/0486 375/211
(Continued)

FOREIGN PATENT DOCUMENTS

KR    10-2010-0111608 A    10/2010

*Primary Examiner* — James M Perez
(74) *Attorney, Agent, or Firm* — Dentons US LLP

(57) ABSTRACT

A method for cancelling self-interference by a base station that uses a full duplex radio (FDR) scheme may comprise the steps of: transmitting, to a terminal, information associated with reference signal (RS) power boosting, which has been changed for estimation of a self-interference channel; transmitting an RS on the basis of the changed RS power boosting; estimating the self-interference channel according to the RS; and cancelling the self-interference on the basis of the estimation of the self-interference channel.

12 Claims, 8 Drawing Sheets

(51) Int. Cl.
*H04L 25/02* (2006.01)
*H04L 27/26* (2006.01)
*H04W 72/08* (2009.01)

(52) U.S. Cl.
CPC ........ *H04L 25/03821* (2013.01); *H04L 27/26* (2013.01); *H04L 27/2691* (2013.01); *H04W 72/082* (2013.01)

(58) Field of Classification Search
USPC .................................. 375/219–223, 259–285
See application file for complete search history.

(56) References Cited

U.S. PATENT DOCUMENTS

| | | | | |
|---|---|---|---|---|
| 9,282,558 | B2* | 3/2016 | Seo | H04B 7/2656 |
| 9,841,857 | B2* | 12/2017 | Hwang | G06F 3/044 |
| 10,004,039 | B2* | 6/2018 | Clausen | H04W 52/0238 |
| 2005/0084003 | A1* | 4/2005 | Duron | G06K 7/0008 |
| | | | | 375/221 |
| 2007/0002957 | A1* | 1/2007 | Zhou | H04L 1/0054 |
| | | | | 375/260 |
| 2007/0211684 | A1* | 9/2007 | Lee | H04W 52/08 |
| | | | | 370/342 |
| 2008/0144749 | A1* | 6/2008 | Wilhelmsson | H04L 25/03248 |
| | | | | 375/346 |
| 2009/0167156 | A1* | 7/2009 | Kawamura | C09K 11/06 |
| | | | | 313/504 |
| 2010/0254471 | A1* | 10/2010 | Ko | H04L 5/0023 |
| | | | | 375/260 |
| 2011/0026415 | A1* | 2/2011 | Kamuf | H04W 72/0453 |
| | | | | 370/252 |
| 2011/0080896 | A1* | 4/2011 | Krishnamurthy | H04W 56/0045 |
| | | | | 370/336 |
| 2011/0111695 | A1* | 5/2011 | Shameli | H04B 5/02 |
| | | | | 455/41.1 |
| 2012/0134275 | A1* | 5/2012 | Choi | H04L 5/0057 |
| | | | | 370/241 |
| 2012/0189037 | A1* | 7/2012 | Seo | H04B 7/026 |
| | | | | 375/213 |
| 2013/0121186 | A1* | 5/2013 | Vajapeyam | H04W 72/085 |
| | | | | 370/252 |
| 2013/0122802 | A1* | 5/2013 | Wang | H04B 7/15535 |
| | | | | 455/9 |
| 2013/0329662 | A1* | 12/2013 | Chen | H04W 72/0473 |
| | | | | 370/329 |
| 2014/0016515 | A1* | 1/2014 | Jana | H04L 5/143 |
| | | | | 370/278 |
| 2014/0198688 | A1* | 7/2014 | Li | H04L 5/1461 |
| | | | | 370/278 |
| 2014/0301498 | A1* | 10/2014 | Rimini | H04B 1/12 |
| | | | | 375/285 |
| 2015/0156724 | A1* | 6/2015 | Clausen | H04W 52/0238 |
| | | | | 370/252 |
| 2015/0244505 | A1* | 8/2015 | Celebi | H04W 52/36 |
| | | | | 370/277 |
| 2015/0256320 | A1* | 9/2015 | Feng | H04W 52/146 |
| | | | | 370/280 |
| 2015/0312905 | A1* | 10/2015 | Seo | H04B 7/2656 |
| | | | | 370/280 |
| 2015/0358982 | A1* | 12/2015 | Jeon | H04J 11/005 |
| | | | | 370/252 |
| 2016/0127030 | A1* | 5/2016 | Kim | H04B 7/0413 |
| | | | | 370/329 |
| 2016/0182208 | A1* | 6/2016 | Yi | H04L 1/0026 |
| | | | | 370/329 |
| 2016/0366007 | A1* | 12/2016 | Hwang | H04L 27/3809 |
| 2017/0041121 | A1* | 2/2017 | Noh | H04W 52/325 |
| 2017/0353214 | A1* | 12/2017 | Lins de Medeiros | H04B 3/32 |
| 2017/0366226 | A1* | 12/2017 | Weissman | H04B 3/487 |
| 2018/0048347 | A1* | 2/2018 | Kim | H04B 1/525 |
| 2018/0102817 | A1* | 4/2018 | Park | H04B 7/04 |
| 2018/0115357 | A1* | 4/2018 | Park | H04B 7/04 |
| 2018/0123654 | A1* | 5/2018 | Park | H04B 7/04 |
| 2018/0123710 | A1* | 5/2018 | Kim | H04B 17/10 |
| 2018/0254926 | A1* | 9/2018 | Kim | H04L 25/02 |
| 2018/0270008 | A1* | 9/2018 | Yi | H04J 11/0069 |
| 2019/0036756 | A1* | 1/2019 | Yi | H04J 11/0069 |
| 2019/0052382 | A1* | 2/2019 | Kim | H04L 5/001 |

\* cited by examiner

METHOD FOR CANCELLING SELF-INTERFERENCE BY APPARATUS THAT USES FDR SCHEME

This application is a 35 USC § 371 National Stage entry of International Application No. PCT/KR2016/005472 filed on May 24, 2016, and claims priority to U.S. Provisional Application No. 62/215,039 filed on Sep. 7, 2015, all of which are hereby incorporated by reference in their entireties as if fully set forth herein.

TECHNICAL FIELD

The present invention relates to wireless communication, and more particularly, to a method performed by an apparatus using an FDR scheme for cancelling self-interference.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE OF THE INVENTION

Technical Problem

The first object of the present invention is to provide a method performed by a BS using a full duplex radio (FDR) scheme for performing self-interference (SI) cancellation.

The second object of the present invention is to provide a method performed by a UE using an FDR scheme for performing SI cancellation.

The third object of the present invention is to provide a UE for performing SI cancellation in an environment where an FDR scheme is used.

The fourth object of the present invention is to provide a BS for performing SI cancellation in an environment where an FDR scheme is used.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the first object of the present invention, provided herein is a method for performing self-interference (SI) cancellation by a base station (BS) using a full duplex radio (FDR) scheme, including: transmitting, to a user equipment (UE), information related to changed reference signal (RS) power boosting for estimating an SI channel; transmitting an RS based on the changed RS power boosting; estimating the SI channel in accordance with the RS; and performing the SI cancellation based on the estimated SI channel. In this case, the information related to the changed RS power boosting may include an indicator indicating that boosting of the RS is off. In addition, the information related to the changed RS power boosting may include a ratio of energy per resource element (EPRE) of the RS to physical downlink shared channel (PDSCH) EPRE of a symbol without the RS or a ratio of the EPRE of the RS to PDSCH EPRE of a symbol with the RS. Moreover, the information related to the changed RS power boosting may include a ratio of physical downlink shared channel (PDSCH) energy per resource element (EPRE) of a symbol with the RS to PDSCH EPRE of a symbol without the RS. In this case, the ratio of the PDSCH EPRE of the symbol with the RS to the PDSCH EPRE of the symbol without the RS may be 1.

To achieve the second object of the present invention, provided herein is a method for performing self-interference (SI) cancellation by a user equipment (UE) using a full duplex radio (FDR) scheme, including: transmitting, to a base station (BS), information related to changed reference signal (RS) power boosting for estimating an SI channel; transmitting an RS based on the changed RS power boosting; estimating the SI channel in accordance with the RS; and performing the SI cancellation based on the estimated SI channel.

To achieve the third object of the present invention, provided herein is a base station (BS) for performing self-interference (SI) cancellation in an environment using a full duplex radio (FDR) scheme, including: a transmitter and a processor. In this case, the processor may be configured to: control the transmitter to transmit, to a user equipment (UE), information related to changed reference signal (RS) power boosting for estimating an SI channel and transmit an RS based on the changed RS power boosting; estimate the SI channel in accordance with the RS; and perform the SI cancellation based on the estimated SI channel. At this time, the information related to the changed RS power boosting may include an indicator indicating that boosting of the RS is off. In addition, the information related to the changed RS power boosting may include a ratio of energy per resource element (EPRE) of the RS to physical downlink shared channel (PDSCH) EPRE of a symbol without the RS or a ratio of the EPRE of the RS to PDSCH EPRE of a symbol with the RS. Moreover, the information related to the changed RS power boosting may include a ratio of physical downlink shared channel (PDSCH) energy per resource element (EPRE) of a symbol with the RS to PDSCH EPRE of a symbol without the RS. In this case, the ratio of the PDSCH EPRE of the symbol with the RS to the PDSCH EPRE of the symbol without the RS may be 1.

To achieve the fourth object of the present invention, provided herein is a user equipment (UE) for performing self-interference (SI) cancellation in an environment using a full duplex radio (FDR) scheme, including: a transmitter and a processor. In this case, the processor may be configured to: control the transmitter to transmit, to a user equipment (UE), information related to changed reference signal (RS) power boosting for estimating an SI channel and transmit an RS based on the changed RS power boosting; estimate the SI channel in accordance with the RS; and perform the SI cancellation based on the estimated SI channel.

Advantageous Effects

According to the present invention, a difference between nonlinearity resulting from SI channel estimation and nonlinearity resulting from SI cancellation can be eliminated or reduced, and thus a BS can achieve stable digital SI cancellation based on channel estimation performance.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
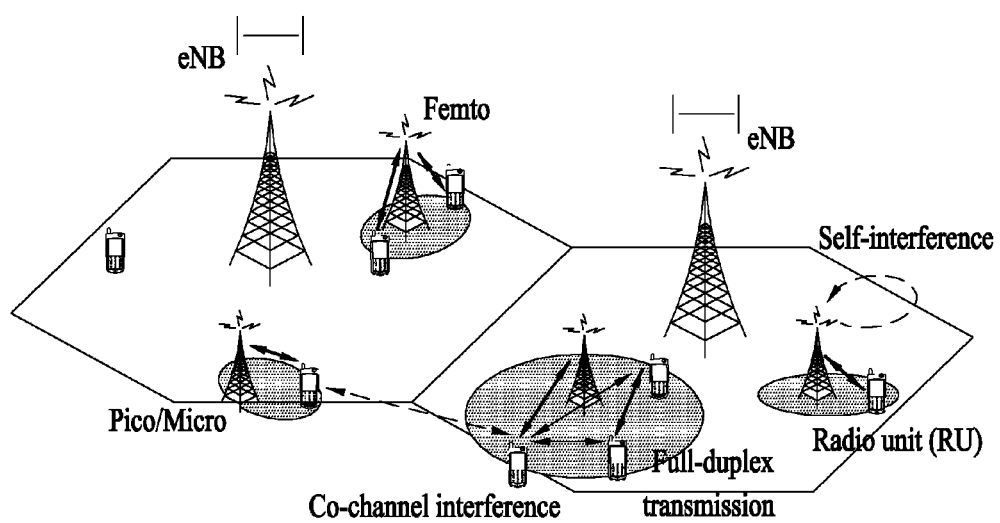
FIG. 1 is a diagram illustrating an exemplary network supporting full-duplex/half-duplex communication operation schemes for a UE proposed in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
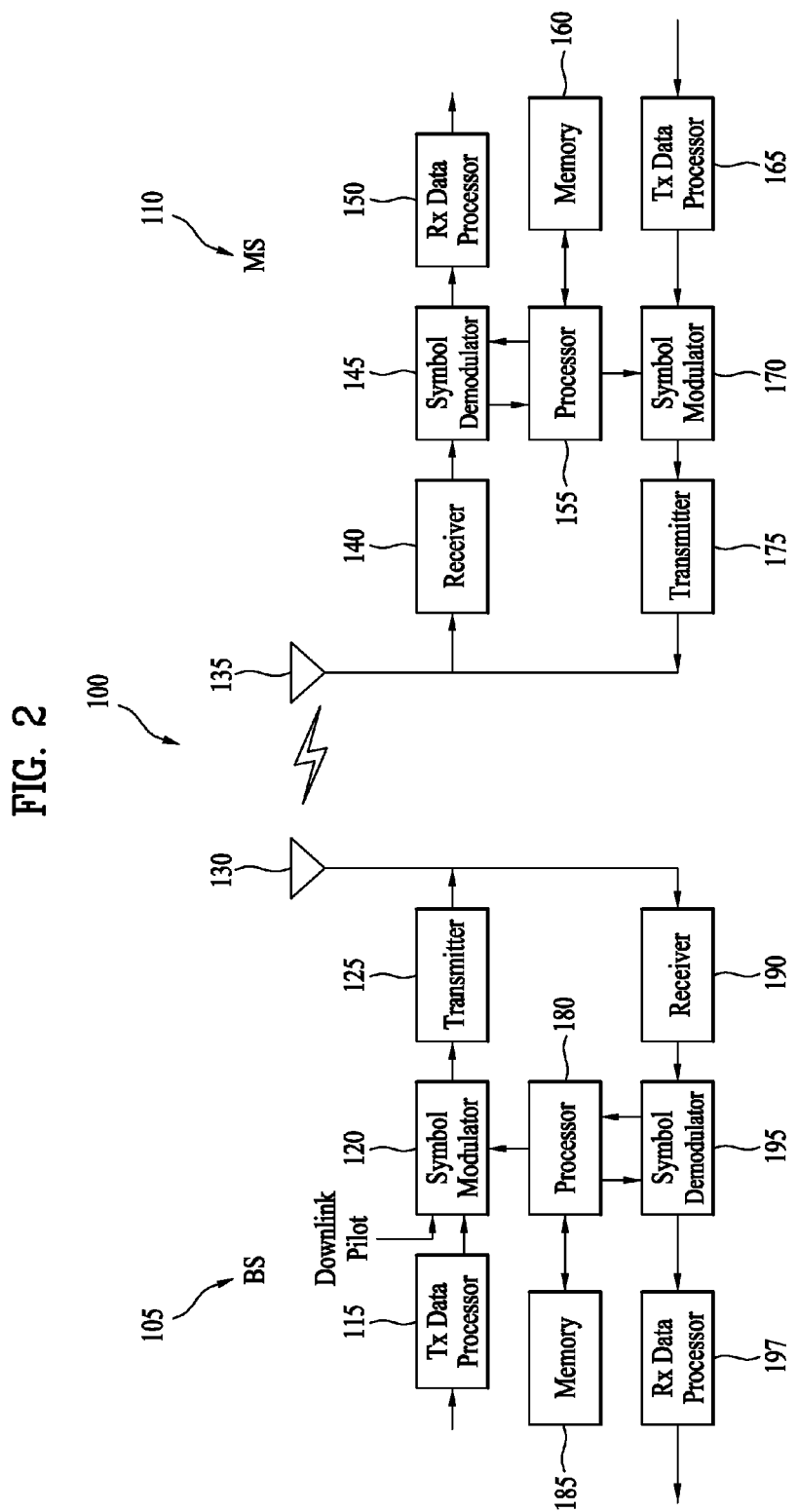
FIG. 2 is a block diagram for configurations of a base station (BS) 105 and a user equipment (UE) 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
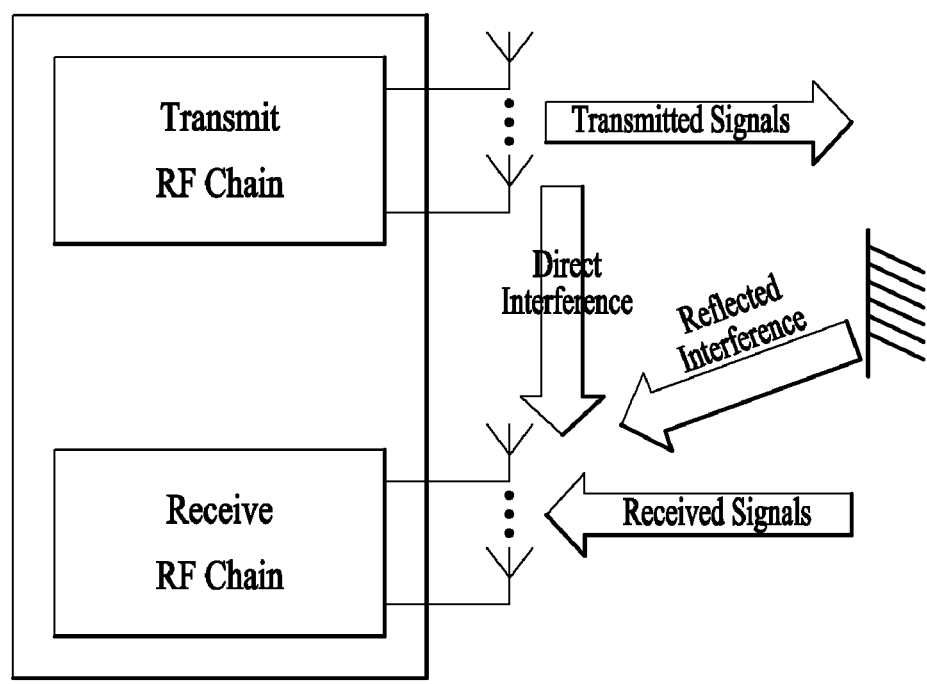
FIG. 3 is a conceptual diagram illustrating transmission/reception links and self-interference (SI) in an FDR communication environment.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW}=-174$ dBm+10×$\log_{10}$ (BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
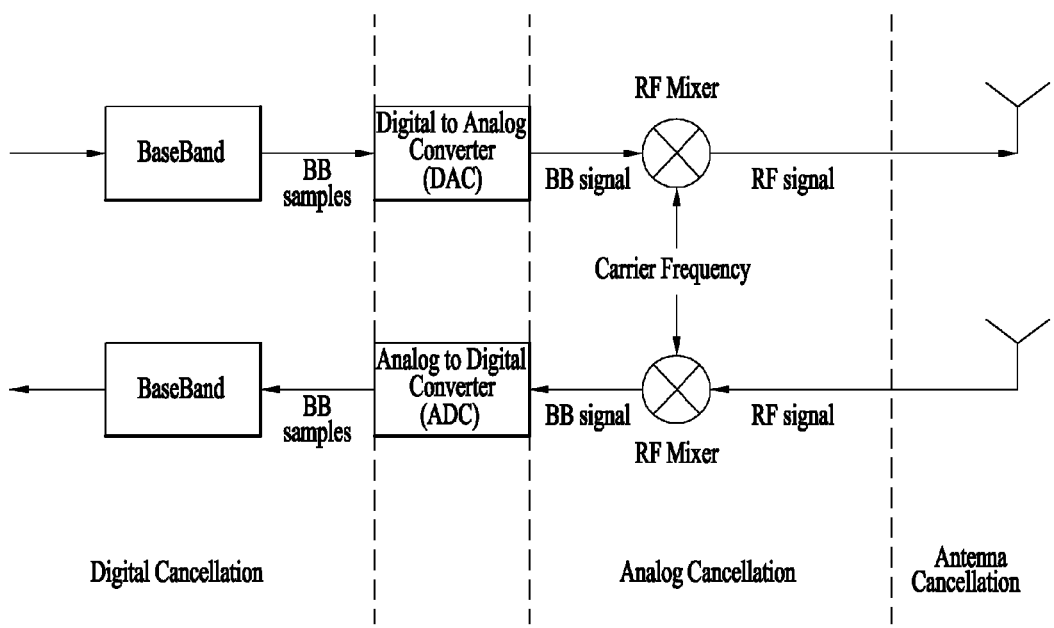
FIG. 4 is a diagram illustrating positions where three interference cancellation schemes are applied in an RF transmission and reception end (or RF front end) of an apparatus.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
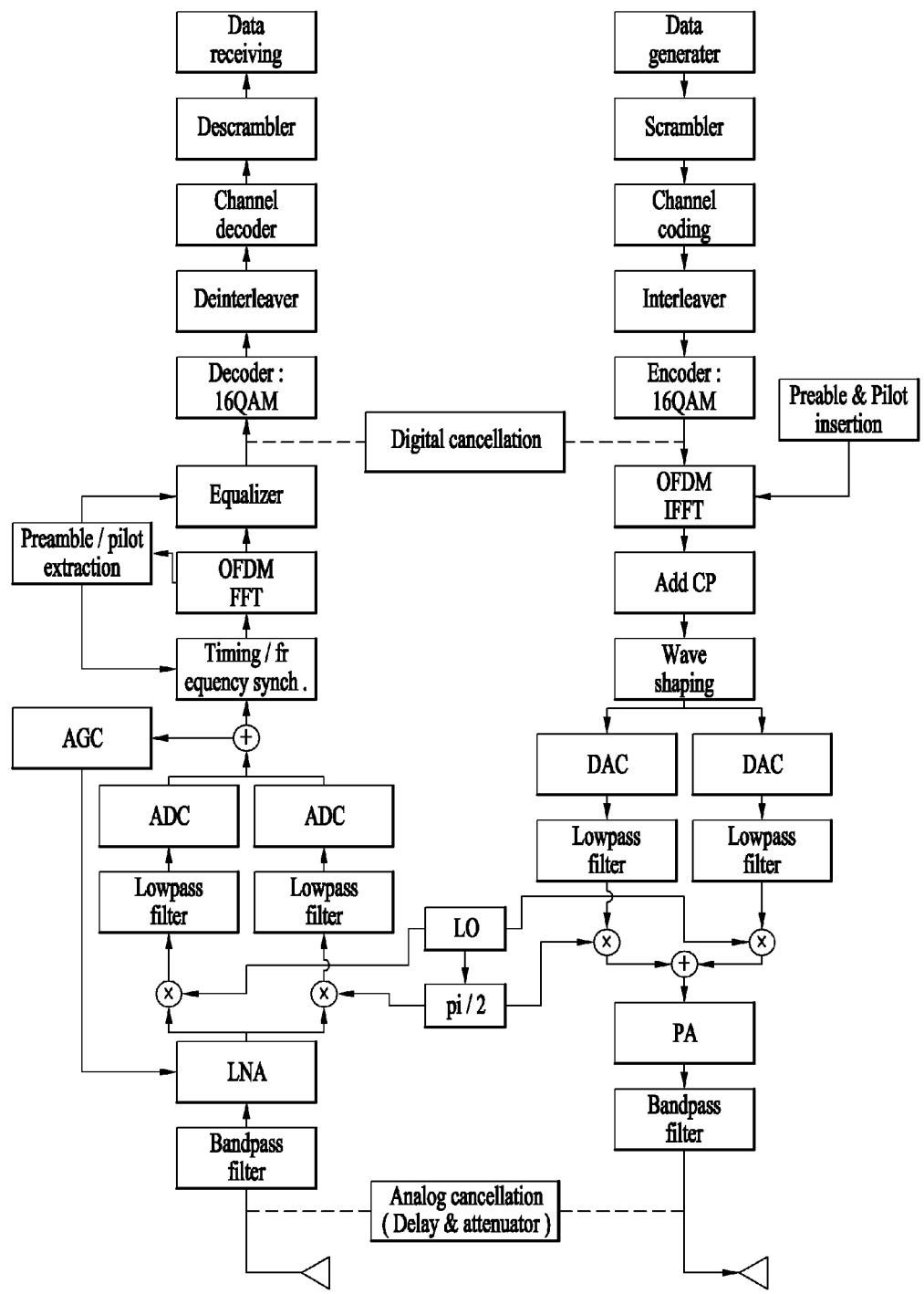
FIG. 5 is a block diagram of a self-interference (Self-IC) device installed in a proposed communication apparatus operating in the OFDM communication system with reference to FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

Since the FDR system uses the same frequency for the Tx signal and the Rx signal, non-linear components of the RF are greatly affected. In particular, Tx signals are distorted due to nonlinear characteristics of active apparatuses such as the power amplifier (PA) and the low noise amplifier (LNA). Due to such distortions, modeling of the Tx signal may include high-order components. Thereamong, even-order components, which affect DC periphery, can be effectively removed using the conventional AC coupling or filtering technique. However, the odd-order components, which appear in the vicinity of an existing frequency, are not easily removed compared to the even-order components, and have a great influence upon reception. Considering these nonlinear characteristics of the odd-order components, the Rx signal after the ADC in the FDR system may be represented by Equation 1 below, using the parallel Hammerstein (PH) model.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n) \quad \text{[Equation 1]}$$

In Equation 1, k has an odd number value, $x_{SI}[n]$ indicates data transmitted at an RF transmitting end of the apparatus, $h_{SI}[n]$ indicates a gain of a self-interference channel (self-channel) through which the data transmitted at the RF transmitting end passes, $x_D[n]$ indicates data which an RF end of the apparatus desires to receive, $h_D[n]$ indicates a gain of a desired channel through which the data that the RF end desires to receive passes, and $z[n]$ indicates Additive White Gaussian Noise (AWGN). In this case, if k is equal to 1, it corresponds to a linear component. If k is an odd number equal to or greater than 3, it corresponds to a nonlinear component.

In the FDR system, the power of self-interference increases as transmit power increases. Therefore, if the performance of the antenna self-IC and the analog self-IC is fixed, more self-IC components should be removed in digital self-IC in order to achieve desired target self-IC performance when the Tx power increases.

When the transmit power of the apparatus driven in the FDR scheme increases, the power of nonlinear SI components generated according to the characteristics of the FDR apparatus increases with a higher rate of increase than the linear SI components. The correlation between change in Tx power and the power of the linear SI component and the power of the nonlinear SI component may be expressed as shown in FIG. 6.

Figure 6:
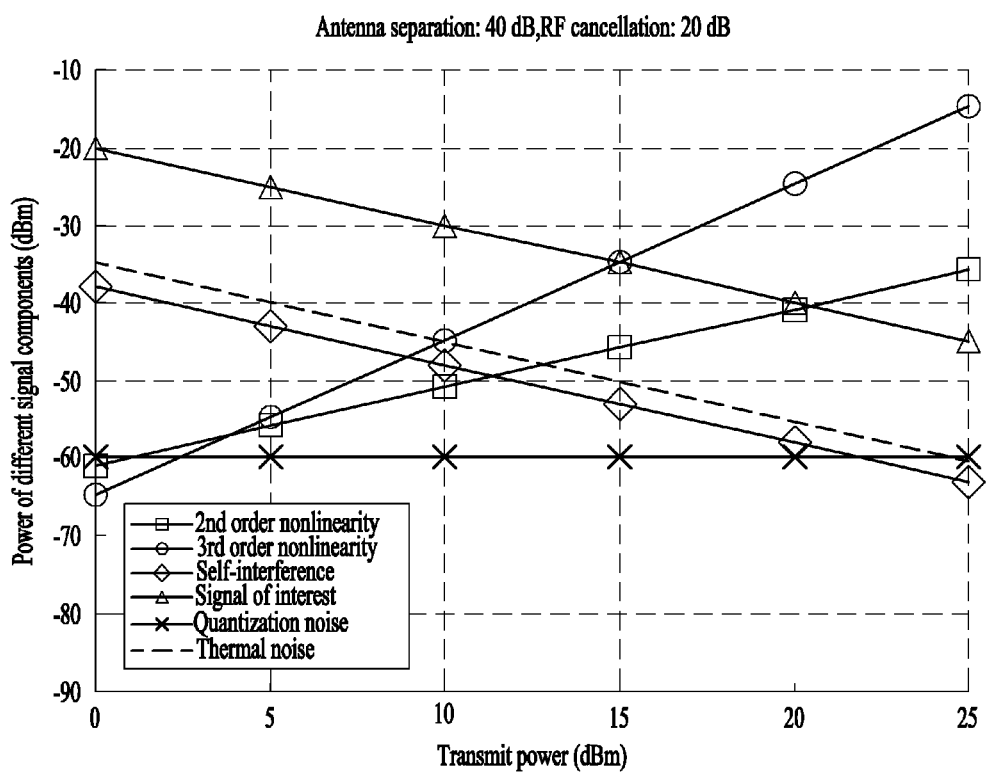
FIG. 6 is a diagram illustrating power differences of individual SI components in the FDR system depending on changes in transmit power.

FIG. 6 is a diagram showing a difference in power between respective SI components in the FDR system according to change of transmit power.

As shown in FIG. 6, when the transmit power is low (10 dBm or less), the power of the second-order nonlinear SI component (square marker) and the power of the third-order nonlinear SI component (circle marker) are below the thermal noise (dotted line), and therefore the desired self-IC performance may be obtained by digital self-interference cancellation alone considering only the linear SI components.

However, as the transmit power increases (beyond 10 dBm), the power of the second-order nonlinear SI component and the power of the third-order nonlinear SI component increase significantly over the thermal noise. Further, since the power of the nonlinear SI component increases over the power of the desired signal, the desired self-IC performance may not be obtained with digital self-interference cancellation considering only the linear SI component.

Moreover, it is evident that the SINR at the time of reception will be significantly lowered due to self-interference of high-order components which have not been removed. Therefore, when the transmit power increases, the powers of the linear and nonlinear SI components also increase, and accordingly nonlinear digital self-interference cancellation should be designed considering even the nonlinear SI components, that have not been considered previously, in order to stably operate the FDR system.

Generally, when a pilot signal (or reference signal) is transmitted in the LTE system, its transmit power is power-boosted (e.g., 3 dB boosting) compared to data transmit power to improve channel estimation performance. If the receiving end fails to correctly understand the pilot power configured for the transmission, the receiving end performs channel estimation and data decoding based on the misunderstood boosted pilot power, and it causes degradation of transmission performance due to a channel estimation error, which results from the erroneous power difference. That is, to prevent this performance degradation, the amount of boosted power for the pilot signal transmission should be accurately known to both the transmitting and receiving ends. To this end, the legacy 3GPP LTE system is designed to inform a UE of pilot booting information using RS EPRE (energy per resource element) through downlink signaling. It will be described in detail later. Table 2 below shows EPRE/PDSCH EPRE described in 3GPP TS 36.213.

TABLE 2

| |
|---|
| The eNodeB determines the downlink transmit energy per resource element. |
| A UE may assume downlink cell-specific RS EPRE is constant across the downlink system bandwidth and constant across all subframes until different cell-specific RS power information is received. The downlink reference-signal EPRE can be derived from the downlink reference-signal transmit power given by the parameter Reference-signal-power provided by higher layers. The downlink reference-signal transmit power is defined as the linear average over the power contributions (in [W]) of all resource elements that carry cell-specific reference signals within the operating system bandwidth. |
| The ratio of PDSCH EPRE to cell-specific RS EPRE among PDSCH REs (not applicable to PDSCH REs with zero EPRE) for each OFDM symbol is denoted by either $\rho_A$ or $\rho_B$ according to the OFDM symbol index as given by Table 5.2.-2. In addition, $\rho_A$ or $\rho_B$ are UE specific. |
| The UE may assume that for 16QAM, 64QAM, TRI > 1 spatial multiplexing or for PDSCH transmission associated with the multi-user MIMO transmission mode. |
| $\rho_A$ is equal to $\delta_{power\text{-}offset}$ when the UE receives a PDSCH data transmission using precoding for transmit diversity with 4 cell-specific antenna ports according to Section 6.3.4.3 of [3] |
| $\rho_A$ is equal to $\delta_{power\text{-}offset} + P_A$ |
| Where $\delta_{power\text{-}offset}$ is 0 dB for all transmission modes except multi-user MIMO and where $P_A$ is a UE specific parameter provided by higher layers. |
| If UE-specific RSs are present in a PRB, the ratio of PDSCH EPRE to UE-specific RS EPRE for each OFDM symbol is equal. In addition, the UE may assume that for 16QAM or 64QAM, this ratio is 0 dB. |
| The cell-specific ratio $\rho_B/\rho_A$ is given by following Table 3 according to cell-specific parameter $P_B$ signaled by higher layers and the number of configured eNodeB cell specific antenna ports. |

TABLE 3

The cell-specific ratio $\rho_B/\rho_A$ for
1, 2, or 4 cell specific antenna ports

| | $\rho_B/\rho_A$ | |
|---|---|---|
| $P_B$ | One antenna port | Two and four antenna ports |
| 0 | 1 | 5/4 |
| 1 | 4/5 | 1 |
| 2 | 3/5 | 3/4 |
| 3 | 2/5 | 1/2 |

Table 4 shows OFDM symbol indices within a slot where the ratio of the corresponding PDSCH EPRE to the cell-specific RS EPRE is denoted by $\rho_A$ or $\rho_B$.

TABLE 4

| | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| Number of antenna ports | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

TABLE 5

Table 5 below shows CQI-ReportConfig information elements including normal PUSCH-RS-EPRE offset values in the LTE system. The CQI-ReportConfig information elements are signaled by the BS to the UE through higher layer signaling (e.g., RRC signal).

```
-- ASN1START
CQI-ReportConfig ::=            SEQUENCE {
    cqi-ReportModeAperiodic     ENUMERATED {
    rm12, rm20, rm22, rm30, rm31,
    spare3, spare2, spare1} OPTIONAL,    -- Need OR
    nomPDSCH-RS-EPRE-Offset     INTEGER (-1..6),
    cqi-ReportPeriodic          OPTIONAL
        -- Need ON
}
```

TABLE 6

Table 6 below shows a PDSCH-Config information element. The BS signals the PUSCH-Config information element to the UE through higher layer signaling (e.g., RRC signal). The values of $P_A$ and $P_B$ described in Table 2 are included in the PDSCH-Config information element.

```
-- ASN1START
PDSCH-ConfigCommon::=    SEQUENCE {
    referenceSignalPower        INTEGER (-60..50),
    p-b                         INTEGER (0..3)
}
PDSCH-ConfigDedicated::= SEQUENCE {
    p-a                         ENUMERATED {
                                dB-6,dB-4dot77, dB-3, dB-1dot77, dB0,
dB1, dB2, dB3 }}
```

TABLE 7

-- Cell Specific --
referenceSignalPower INTEGER (-60..50)
p-b                  INTEGER (0..3)

TABLE 7-continued

-- UE Specific --
p-a                  ENUMERATED {dB-6, dB-4dot77, dB-3,
                     dB-1dot77, dB0, dB1, dB2, dB3 }

It can be seen from Table 7 that $P_B$ is a cell-specific value, and $P_A$ is a user-specific value.

The power of the cell-specific reference signal has a cell-specific value (i.e., it is constant across the downlink bandwidth), and the data power has a UE-specific value. In addition, the RS power is given as an integer value, and the data power is expressed as a ratio compared to the RS power. There are two types of data power: one is the power of the PDSCH with no RS and the other one is the power of the PDSCH with an RS.

The RS power is expressed as an integer in the range of −60 to 50. In the case of the data power, $\rho_A$ is expressed as a ratio of cell-specific RS EPRE ($P_{CRS}$) to PDSCH EPRE ($P_{Data\_NRS}$) of the symbol with no RS (i.e., $P_{CRS}/P_{Data\_NRS}$), and $\rho_B$ is expressed as a ratio of cell-specific RS EPRE ($P_{CRS}$) to PDSCH EPRE ($P_{Data\_RS}$) of the symbol with an RS (i.e., $P_{CRS}/P_{Data\_RS}$).

In the case of data demodulation, a ratio of RS EPRE to data EPRE is considered as an important value. The ratio of RS to data of the symbol with no RS, $\rho_A$ is transmitted from the BS to the UE through higher layer signaling. On the other hand, the ratio of RS to data of the symbol with an RS, $\rho_B$ can be calculated using $\rho_A$, which is given in a UE-specific manner, and $P_B$, which is given in a cell-specific manner That is, in the environment where the cell-specific RS is used, the RS EPRE is a cell-specific value and the data EPRE is a UE-specific value.

In the case of one antenna port in Table 3, an RB in the OFDM symbol with an RS is composed of 2 REs for the RS and 10 REs for data. In this case, to boost RS power, it is possible to uniformly extract power from 5 data REs and then use the extracted power to increase the RS power. For example, assuming that the energy transmitted in each RE is 1, by reducing the energy in each of the 5 data REs by ⅕ and increasing the energy in an RS RE by 1, the RS power can be increased by 3 dB. In this case, since the energy of each of the data REs in the OFDM symbol with the RS becomes ⅘, and the energy of each data RE in the OFDM symbol with no RS is still 1, the ratio of data EPRE in the OFDM symbol with the RS to data EPRE in the OFDM symbol with no RS (i.e., EPRE for data in OFDM symbol with RS to EPRE for data in OFDM symbol without RS ratio) can be expressed as ⅘.

In the case of two/four antenna ports, an RB in the OFDM symbol with an RS is composed of 4 REs for the RS and 8 REs for data. In this case, the 4 RS REs can be separately used as follows: two REs are used for a certain antenna and the remaining two REs are used for another antenna. From the perspective of a Tx antenna, the RS (RS1) for estimating a channel of the certain antenna is transmitted on the RE corresponding to RS1 through the corresponding antenna, and '0' energy is transmitted on the RE for the RS (RS2) for another antenna. As described above, the unused energy may be used for data transmission or RE transmission for RS1. In the case of '1' energy for RS 2, since the energy of each of 4 data REs may be increased by ¼, that is, the energy transmitted on each of the data REs becomes 5/4, the ratio with EPRE of the data RE in the OFDM symbol with no RS can be expressed as 5/4. When the energy for RS2 is used for RS1 transmission, EPRE of RS1 becomes a double of the data EPRE in the OFDM symbol with no RS (=3 dB), and the ratio of the data EPRE in the OFDM symbol with the RS to the EPRE for data in the OFDM symbol with no RS becomes '1' ($P_B=1$).

FIGS. 7a to 7e are diagrams for explaining RS EPRE/PDSCH EPRE described in 3GPP TS 36.213.

Figure 7A:
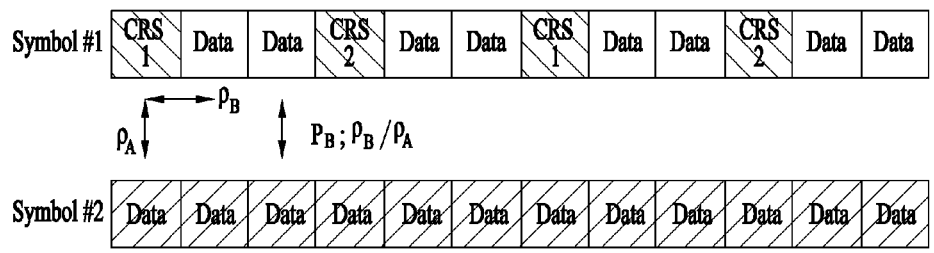
FIGS. 7a to 7e are diagrams for explaining RS EPRE/PDSCH EPRE described in 3GPP TS 36.213.
Figure 7B:
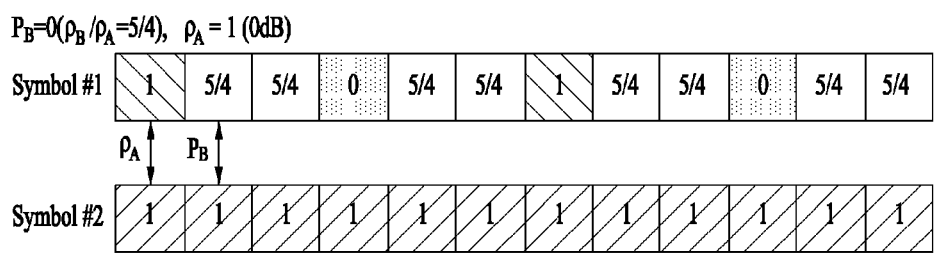
Figure 7C:
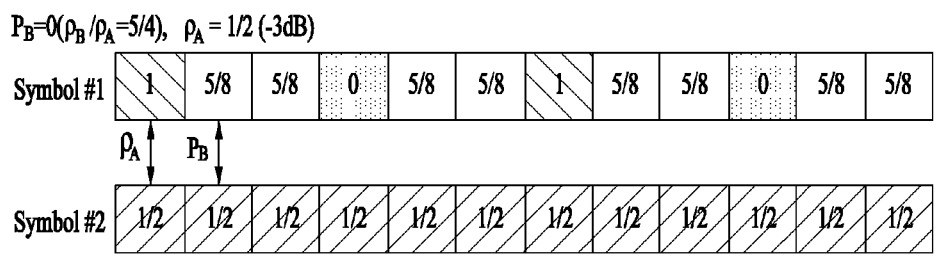
Figure 7D:
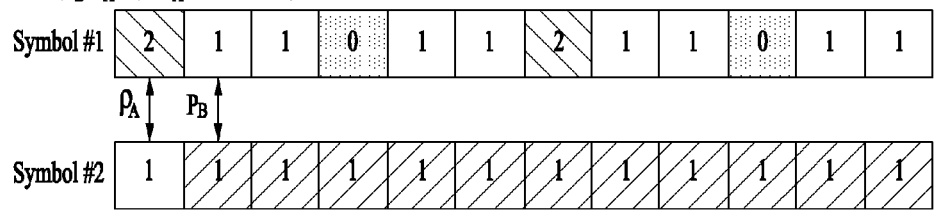
Figure 7E:
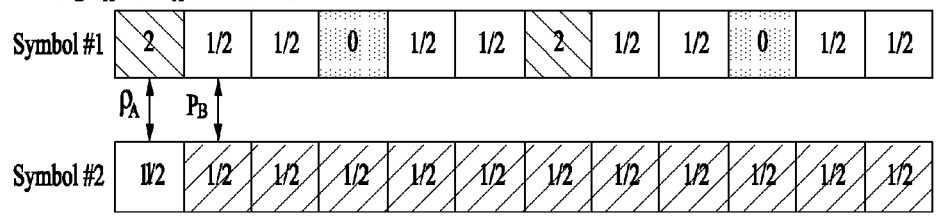

Referring to FIG. 7a, the ratio of CRS (e.g., CRS1) EPRE of symbol 1 (symbol #1) to data EPRE of symbol 2 (symbol #2) can be defined as $\rho_A$, and the ratio of EPRE of symbol 1 (symbol #1) of the data EPRE of symbol 2 can be defined as $\rho_B$. Referring to FIGS. 7b to 7e, a number expressed in each symbol may indicate a power level. Referring to FIG. 7b, $\rho_A=1$ and $\rho_B=5/4$. Thus, it can be seen from Table 3 that $P_B$ is 0. Referring to FIG. 7c, $\rho_A=1/2$ and $\rho_B=5/8$. Thus, it can be seen from Table 3 that $P_B$ is 0. Referring to FIG. 7d, $\rho_A=1/2$ and $\rho_B=1/2$. Thus, it can be seen from Table 3 that $P_B$ is 1. Referring to FIG. 7e, $\rho_A=1/4$ and $\rho_B=1/4$. Thus, it can be seen from Table 3 that $P_B$ is 1.

In the FDR system, since the RS (or pilot) is power-boosted and then transmitted, the RS transmit power is different from the data transmit power. Thus, nonlinear characteristics of the SI channel may be different from those when data is transmitted. Since it is expected that the nonlinearity of the SI channel estimated from the power-boosted RS (or pilot) has more high-order components due to the boosted transmit power, the higher-order components should be considered in estimating the SI channel. On the contrary, when the symbol including only data except the RS is transmitted, its transmit power is not boosted. Therefore, nonlinear components different from those of the RS may occur. In this case, if the SI cancellation is performed by considering the nonlinearity estimated by assuming that the RS power is boosted, it may cause performance degradation. Thus, when the BS estimates the SI channel either periodically or aperiodically, the BS should turn off or change the power boosting option to perform the SI channel estimation based on the same power as for data or power with the same nonlinearity, and it needs to be informed a corresponding received end through signaling.

In addition, when uplink power control is performed in the 3GPP LTE/LTE-A system, power of a PUCCH, a PUSCH, and an SRS is controlled respectively. In this case, the transmit power of the SI channel estimated through an uplink demodulation (DM) RS or an RS for nonlinear SI channel estimation may be different from the transmit power of the PUCCH, PUSCH, or SRS, and thus nonlinear components become different from each other due to the different transmit power. In this case, if the SI cancellation is performed based on the nonlinearity estimated using the different RS power, it may cause performance degradation. Thus, when the UE estimates the SI channel either periodically or aperiodically, the UE needs to perform the SI channel estimation based on the same power or power with the same nonlinearity by considering the transmit power of the PUCCH, PUSCH, and SRS, and it should be informed the BS through signaling. Hereinafter, a description will be given of a signaling method.

Embodiment 1

The BS can transmit, to the UE, changed boosting information through a physical layer signal (e.g., PDCCH, PDSCH, EPDCCH, etc.) or a higher layer signal (e.g., RRC) either instantaneously or periodically for the purpose of the SI channel estimation unlike the RS power boosting information used for downlink channel estimation.

When the BS needs to change a RS power boosting configuration to estimate the SI channel either periodically or aperiodically, the BS may transmit to the UE the changed information either periodically or aperiodically. By doing so, a difference between the nonlinearity occurring when the BS performs the SI channel estimation and the nonlinearity occurring when the SI cancellation is performed can be eliminated or reduced, and thus the BS can achieve stable digital SI cancellation based on the improved channel estimation performance. In addition, the UE can perform channel estimation and data decoding using the accurate RS power based on the information on the changed RS power boosting configuration, which is received from the BS.

For example, the changed booting information for either the periodic or aperiodic SI channel estimation may signal to the UE a relative boosting power ratio ($\rho A$ or $\rho_B$) or an indicator (e.g., 1-bit indicator) indicating boosting is on/off based on a predetermined configuration value. Alternatively, the booting information changed for either the periodic or aperiodic SI channel estimation may be transmitted as the values of p-b ($P_B$ in Table 2) and p-a ($P_A$ in Table 2) specified by the PDSCH-Config information element. Preferably, p-b and p-a can be specified as 1 and 0 dB, respectively. In particular, in the case of P-b=1 dB and p-a=0 dB, the different between the nonlinearity resulting from the SI channel estimation and the nonlinearity resulting from the SI channel cancellation can be eliminated.

In general, when the BS needs to change the RS power boosting configuration for the SI channel estimation, the BS signals to the UE the indicator indicating booting off.

As another example, in the case of the periodic SI channel estimation, the BS may transmit to the UE information including the start point and period of the SI channel estimation instead of the changed boosting information to reduce signaling overhead.

Embodiment 2

When the UE needs to change a power control configuration to estimate the SI channel either periodically or aperiodically, the UE may transmit to the BS the changed information either periodically or aperiodically. By doing so, a difference between the nonlinearity occurring when the UE performs the SI channel estimation and the nonlinearity occurring when the SI cancellation is performed can be eliminated or reduced, and thus the UE can achieve stable digital SI cancellation based on the improved channel estimation performance. In addition, the BS can perform channel estimation and data decoding using the accurate SRS power based on the information on the changed RS power boosting configuration, which is received from the UE.

For example, the changed power control information may be transmitted as power control information for an SRS or an indicator (e.g., 1-bit indicator) indicating that the power configuration for FDR SI cancellation is turned on/off based on a predetermined configuration value.

As an example, in the case of the periodic SI channel estimation, the BS may transmit to the UE information including the start point and period of the SI channel estimation instead of the changed power control information to reduce signaling overhead.

Equation 2 corresponds to the power control equation at the UE before the UE operates according to the FDR scheme, and Equation 3 corresponds to the power control equation after the UE changes the RS power boosting information by operating according to the FDR scheme.

$$P_{PEACH}=\min\{P_{CMAX}, \text{PREAMBLE\_RECEIVED\_TARGET\_POWER}+PL\}[dBm]$$

$$P_{SRS}(i) = \min\{P_{CMAX}, P_{SRS\_OFFSET} + 10 \log_{10}(M_{SRS}) + P_{O\_PUSCH}(j) + \alpha(j) \cdot PL + f(i)\}[\text{dBm}]$$

$$P_{PUCCH}(i) = \min\{P_{CMAX}, P_{6\_PUCCH} + PL + h(n_{CQI}, n_{HARQ}) + \Delta_{F\_PUCCH}(F) + g(i)\}[\text{dBm}] \text{[Equation 2]}$$

$$P_{PEACE} = \min\{P_{PUSCH}, \text{PREAMBLE\_RECEIVED\_TARGET\_POWER} + PL\}[\text{dBm}]$$

$$P_{SRS}(i) = \min\{P_{PUSCH}, P_{SRS\_OFFSET} + 10 \log_{10}(M_{SRS}) + P_{O\_PUSCH}(j) + \alpha(j) \cdot PL + f(i)\}[\text{dBm}]$$

$$P_{PUCCH}(i) = \min\{P_{PUSCH}, P_{0\_PUCCH} + PL + h(n_{CQI}, n_{HARQ}) + \Delta_{F\_PUCCH}(F) + g(i)\}[\text{dBm}] \text{[Equation 3]}$$

When the power control is performed as shown in Equation 3, the maximum power value of a physical random access channel (PRACH), SRS, PUCCH, or PUSCH, $P_{CMAX}$ may be changed to $P_{PUSCH}$.

To apply the above-described method, the boosting option for the SI channel estimation can be defined in advance to reduce signaling overhead, and then a table index or a difference between indices may be transmitted or estimated based on other information (e.g., average performance of analog SI cancellation).

In addition, the above-described method can be selectively operated only when there is a power difference between the symbol in which only data is transmitted and the symbol with an RS. For example, the method can be selectively operated only when there is a power difference between the symbol in which only data is transmitted and the symbol with an RS ($P_B=1$ ($\rho_A/\rho_B=1$), $\rho_A=\frac{1}{4}$ (−6 dB) or $P_B=0$ ($\rho_A/\rho_B=5/4$), $\rho_A=\frac{1}{2}$ (−3 dB), etc.) among EPRE options in the 3GPP LTE system.

In addition, the aforementioned method can be selectively operated only when a BS or a UE operates in the FDR mode. The BS can operate in the FDR mode in the following cases: a UE operating in the FDR mode accesses to the BS or a UE that desires downlink reception and a UE that desires uplink transmission desire to perform communication at the same time. In this case, the method can be selectively operated.

In general, since the amount of downlink data traffic is relatively greater than that of uplink data traffic, some of UEs that desire uplink transmission should be able to operate in the FDR mode in order for a certain UE to operate in the FDR mode. In this case, the method can be selectively operated. For example, the BS can expect duration of UE's FUR operation based on a buffer status report (BSR) and trigger UE's control signal transmission so as to receive necessary information from the UE through a physical layer signal or higher layer signal at a desired time.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from a BS to a UE through a predefined signal (e.g., physical layer signal, higher layer signal, etc.).

The aforementioned embodiments are achieved by combination of structural elements and features of the present invention in a predetermined manner Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method performed by a base station using an FDR scheme for performing self-interference cancellation can be industrially applied to various wireless communication systems including the 5G system and the like.

What is claimed is:

1. A method for performing self-interference (SI) cancellation by a base station (BS) based on a full duplex radio (FDR) scheme, the method comprising:
    transmitting, to a user equipment (UE), information for estimating an SI channel,
    wherein the information is related to a change in reference signal (RS) power boosting when aperiodic SI channel estimation is configured; and
    wherein the information includes a starting point and period for estimating the SI channel when periodic SI channel estimation is configured;
    transmitting, to the UE, a RS based on the information;
    estimating the SI channel based on the RS; and
    performing the SI cancellation based on the estimated SI channel.

2. The method of claim 1, wherein when aperiodic SI channel estimation is configured, the information includes an indication that RS power boosting is off.

3. The method of claim 1, wherein when aperiodic SI channel estimation is configured, the information includes a ratio of energy per resource element (EPRE) of the RS to physical downlink shared channel (PDSCH) EPRE of a symbol without the RS or a ratio of the EPRE of the RS to PDSCH EPRE of a symbol with the RS.

4. The method of claim 1, wherein when aperiodic SI channel estimation is configured, the information includes a ratio of physical downlink shared channel (PDSCH) energy per resource element (EPRE) of a symbol with the RS to PDSCH EPRE of a symbol without the RS.

5. The method of claim 4, wherein the ratio of the PDSCH EPRE of the symbol with the RS to the PDSCH EPRE of the symbol without the RS is 1.

6. A method for performing self-interference (SI) cancellation by a user equipment (UE) based on a full duplex radio (FDR) scheme, the method comprising:

transmitting, to a base station (BS), information for estimating an SI channel,
wherein the information is related to a change in reference signal (RS) power boosting when aperiodic SI channel estimation is configured; and
wherein the information includes a starting point and period for estimating the SI channel when periodic SI channel estimation is configured;
transmitting, to the BS, a RS based on the information;
estimating the SI channel based on the RS; and
performing the SI cancellation based on the estimated SI channel.

7. A base station (BS) for performing self-interference (SI) cancellation based on a full duplex radio (FDR) scheme, the BS comprising:
a transmitter; and
a processor,
wherein the processor is configured to:
control the transmitter to transmit, to a user equipment (UE), information for estimating an SI channel,
wherein the information is related to a change in reference signal (RS) power boosting when aperiodic SI channel estimation is configured; and
wherein the information includes a starting point and period for estimating the SI channel when periodic SI channel estimation is configured;
control the transmitter to transmit, to the UE, a RS based on the information;
estimate the SI channel based on the RS; and
perform the SI cancellation based on the estimated SI channel.

8. The BS of claim 7, wherein when aperiodic SI channel estimation is configured, the information includes an indication that RS power boosting is off.

9. The BS of claim 7, wherein when aperiodic SI channel estimation is configured, the information includes a ratio of energy per resource element (EPRE) of the RS to physical downlink shared channel (PDSCH) EPRE of a symbol without the RS or a ratio of the EPRE of the RS to PDSCH EPRE of a symbol with the RS.

10. The BS of claim 7, wherein when aperiodic SI channel estimation is configured, the information includes a ratio of physical downlink shared channel (PDSCH) energy per resource element (EPRE) of a symbol with the RS to PDSCH EPRE of a symbol without the RS.

11. The BS of claim 10, wherein the ratio of the PDSCH EPRE of the symbol with the RS to the PDSCH EPRE of the symbol without the RS is 1.

12. A user equipment (UE) for performing self-interference (SI) cancellation based on a full duplex radio (FDR) scheme, the UE comprising:
a transmitter; and
a processor,
wherein the processor is configured to:
control the transmitter to transmit, to a base station (BS), information for estimating an SI channel,
wherein the information is related to a change in reference signal (RS) power boosting when aperiodic SI channel estimation is configured; and
wherein the information includes a starting point and period for estimating the SI channel when periodic SI channel estimation is configured;
control the transmitter to transmit, to the BS, a RS based on the information;
estimate the SI channel based on the RS; and
perform the SI cancellation based on the estimated SI channel.

\* \* \* \* \*